(12) United States Patent
Tanaka et al.

(10) Patent No.: US 8,041,151 B2
(45) Date of Patent: Oct. 18, 2011

(54) FAST METHOD OF SUPER-RESOLUTION PROCESSING

(75) Inventors: Masayuki Tanaka, Tokyo (JP);
Masatoshi Okutomi, Tokyo (JP)

(73) Assignee: Tokyo Instutute of Technology, Tokyo (JP)

( * ) Notice: Subject to any disclaimer, the term of this patent is extended or adjusted under 35 U.S.C. 154(b) by 936 days.

(21) Appl. No.: 11/913,324

(22) PCT Filed: May 1, 2006

(86) PCT No.: PCT/JP2006/309437
§ 371 (c)(1),
(2), (4) Date: Nov. 1, 2007

(87) PCT Pub. No.: WO2006/118352
PCT Pub. Date: Nov. 9, 2006

(65) Prior Publication Data
US 2009/0080806 A1 Mar. 26, 2009

(30) Foreign Application Priority Data
May 2, 2005 (JP) .................................. 2005-134068

(51) Int. Cl.
*G06K 9/32* (2006.01)
*G06K 9/36* (2006.01)
(52) U.S. Cl. ...................................... 382/299; 382/280
(58) Field of Classification Search .................. 382/299, 382/280; 348/266, 268, 272, 273
See application file for complete search history.

(56) References Cited

U.S. PATENT DOCUMENTS 7,515,747 B2 * 4/2009 Okutomi et al. ............. 382/167
7,643,690 B2 * 1/2010 Suzuki et al. ................. 382/236

FOREIGN PATENT DOCUMENTS

JP 2004-316154 A 11/2004
JP 2006-127241 A 5/2006

OTHER PUBLICATIONS

Masayuki Tanaka, et al., "Fast Algorithm for Reconstruction-based Super-resolution", Information Processing Society of Japan Kenkyu Hokoku, Nov. 2004, vol. 2004, No. 113 (CVIM-146), pp. 97-104.

(Continued)

*Primary Examiner* — Yon Couso
(74) *Attorney, Agent, or Firm* — Sughrue Mion, PLLC (57) ABSTRACT

The present invention provides a fast method of super-resolution processing which realizes speedup of the high-speed super-resolution processing by speeding up the calculations of an evaluation function and the differential of the evaluation function with respect to a high-resolution image in a reconstruction-based super-resolution processing.
A fast method of super-resolution processing for speeding up a super-resolution processing that estimates a high-resolution image from multiple low-resolution images with displacements, the method characterized in that an evaluation function and a differential of the evaluation function with respect to the high-resolution image are calculated by a combination of basic image operations.

4 Claims, 7 Drawing Sheets
(1 of 7 Drawing Sheet(s) Filed in Color)

OTHER PUBLICATIONS

Masayuki Tanaka, et al., "A Fast Algorithm for Reconstruction-Based Super-Resolution and Its Accuracy Evaluation", The Transactions of the Institute of Electronics, Information and Communication Engineers D-2, Nov. 2005, vol. J88-D-2, No. 11, pp. 2200 to 2209.

Sung Cheol Park, et al., "Super-Resolution Image Reconstruction: A Technical Overview", IEEE Signal Processing Magazine, May 2003, pp. 21-36.

Brian C. Tom, et al., "Reconstruction of a High-Resolution Image by Simultaneous Registration, Restoration, and Interpolation of Low-Resolution Images", IEEE, 1995, pp. 539-542.

Richard R. Schultz, et al., "Extraction of High-Resolution Frames from Video Sequences", IEEE Transactions on Image Processing, Jun. 1996, pp. 996-1011, vol. 5, No. 6.

Henry Stark, et al., "High-resolution image recovery from image-plane arrays, using convex projections", J. Optical Society of America A, Nov. 1989, pp. 1715-1726, vol. 6, No. 11.

Simon Baker, et al., "Lucas-Kanade 20 Years on: A Unifying Framework", International Journal of Computer Vision, 2004, pp. 221-255, vol. 56, No. 3.

* cited by examiner

METHOD BASED ON EVALUATION FUNCTION
BASED ON MEAN PIXEL VALUE (A)

METHOD 1

(B)

METHOD 2

(C)

METHOD 3

(D)

FAST METHOD OF SUPER-RESOLUTION PROCESSING

TECHNICAL FIELD

The present invention relates to a fast method of super-resolution processing for speeding up super-resolution processing which estimates one high-resolution image from multiple low-resolution images, and more particularly, relates to a fast method of super-resolution processing which realizes speedup of the super-resolution processing by vastly reducing the calculation costs of the super-resolution processing in the reconstruction-based super-resolution processing.

BACKGROUND TECHNIQUE

In recent years, many studies have been reported with regard to the super-resolution processing which estimates one high-resolution image from multiple low-resolution images having displacements (see Non-Patent Document 1). Various methods of the super-resolution processing, for example, the ML (Maximum-Likelihood) method disclosed in Non-Patent Document 2, the MAP method (Maximum A Posterior) method disclosed in Non-Patent Document 3, and the POCS (Projection Onto Convex Sets) method disclosed in Non-Patent Document 4 have been proposed.

The ML method is a method which defines an evaluation function as square error between the pixel value of a low-resolution image estimated from a presupposed high-resolution image and the actually observed pixel value, and obtains a high-resolution image by minimizing the evaluation function as an estimated image. In other words, the ML method is a super-resolution processing method based on the principle of maximum likelihood estimation.

The MAP method is a method which estimates the high-resolution image by minimizing the evaluation function which added probability information of the high-resolution image to square error. In other words, the MAP method is a super-resolution processing method which uses certain prior information regarding the high-resolution image to estimate the high-resolution image as an optimization problem that maximizes posterior probability.

The POCS method is a super-resolution processing method which generates simultaneous equations regarding the pixel values of the low-resolution image and the high-resolution image, and obtains a high-resolution image by solving the simultaneous equations successively.

All of the above-described super-resolution processing methods have the common features of presupposing a high-resolution image and estimating its pixel value for each pixel of all low-resolution images based on point-spread function (PSF) obtained from camera model from the presupposed high-resolution image so that these methods can search for a high-resolution image by minimizing the difference between the estimated value and the observed pixel value (the observed value) Therefore, these super-resolution processing methods are called reconstruction-based super-resolution processing methods.

As described above, the reconstruction-based super-resolution processing is formulated as the optimization problem of the evaluation function defined with respect to the high-resolution image. In other words, the reconstruction-based super-resolution processing is boiled down to the optimization problem of the evaluation function based on square error between the estimated low-resolution image and the observed image.

Since the reconstruction-based super-resolution processing is an optimization calculation with very many unknowns, in order to optimize the evaluation function of the optimization calculation, an iterative calculation method such as steepest descent method is often utilized. In such a case, it is necessary to calculate an evaluation function and differential of the evaluation function with respect to a high-resolution image in each iterative calculation. However, the cost of the iterative calculation is very large. Also, in each iterative calculation, it is necessary to conduct estimation for the pixels of all low-resolution images, and the calculation cost of estimation is also very large.

That is, in the reconstruction-based super-resolution processing, since calculation cost is very large, reducing of calculation cost becomes an important problem.

In order to solve this problem, the inventors of the present invention suggested a "fast method of super-resolution processing" disclosed in Japanese Patent Application No. 2004-316154 (Japanese Patent No. 3837575) from the viewpoint of reducing the pixel value estimating calculation number of times for calculating an evaluation function. That is, this fast method of super-resolution processing is characterized by implementing registration of multiple low-resolution images, setting the discretized points in a high-resolution image space and utilizing the mean pixel value of the pixels corresponding to the neighborhood of the discretized points. In this case, it was shown that a high-speed calculation is possible without losing estimation accuracy by considering the number of the pixels corresponding to the neighborhood of the discretized points as a weight.

In other words, in Japanese Patent Application No. 2004-316154, the inventors of the present invention suggested a fast method of super-resolution processing which utilizes an evaluation function that can reconstruct a high-resolution image without losing estimation accuracy by a little pixel value estimating calculations of low-resolution pixels.

More specifically, the "fast method of super-resolution processing" disclosed in Japanese Patent Application No. 2004-316154 is characterized by considering the pixels of multiple low-resolution images after registration as the pixels sampled at unequal interval within a high-resolution image space, dividing the high-resolution image space into multiple small areas, and utilizing the mean pixel value of the pixels within each small area. The evaluation function for such a small area is expressed by the following Expression 1.

$$I = M|\bar{f} - \hat{f}(x_c, y_c)|^2 \quad \text{[Expression 1]}$$

Where, the following Expression 2 holds.

$$\bar{f} = \frac{1}{M}\sum_{i=1}^{M} f_i \quad \text{[Expression 2]}$$

Where, I represents the evaluation function for a small area, M represents the number of pixels within the small area, $f_i$ represents the pixel value of the i-th pixel within the small area, $(x_c, y_c)$ represents the representative position of the small area, and $\hat{f}(x_c, y_c)$ represents the estimated value of the pixel value corresponding to the representative position of the small area respectively. In the actual calculation, the sum of the evaluation functions for all the small areas becomes the evaluation function of the whole super-resolution processing.

Then, the inventors of the present invention further utilized the evaluation function disclosed in Japanese Patent Application No. 2004-316154 and suggested a fast method of super-resolution processing according to the present invention, from the viewpoint of speeding up the calculations of the evaluation function and the differential of the evaluation function with respect to a high-resolution image.

DISCLOSURE OF THE INVENTION

That is to say, the present invention has been developed in view of the above described circumstances, and an object of the present invention is to provide a fast method of high-resolution processing which realizes speedup of the super-resolution processing by speeding up the calculations of an evaluation function and the differential of the evaluation function with respect to a high-resolution image in a reconstruction-based super-resolution processing.

The present invention relates to a fast method of super-resolution processing for speeding up a super-resolution processing that estimates a high-resolution image from multiple low-resolution images with displacements. The above object of the present invention is effectively achieved by the construction that an evaluation function and a differential of said evaluation function with respect to said high-resolution image are calculated by a combination of basic image operations.

The above object of the present invention is also effectively achieved by the construction that said evaluation function is formulated with respect to said high-resolution image of spatial region as follows:

$$I(h) = \|b*h - f\|_w^2 + \alpha \|c*h\|_2^2$$

said differential of said evaluation function with respect to said high-resolution image of spatial region is formulated as follows:

$$\frac{\partial I}{\partial h} = 2b' * (w \otimes (b*h - f)) + 2\alpha c' * c * h$$

where h is vector representation of said high-resolution image of spatial region, b is vector representation of a PSF image, f is vector representation of a mean observed image, w is vector representation of a weighted image, c is vector representation of a kernel image indicating prior information about said high-resolution image, α represents a constraint parameter indicating constraint intensity, * represents convolution integral operation, and ⊗represents multiplication for every element.

Here, two norms $\|x\|_w^2, \|x\|_2^2$ are defined as follows:

$$\|x\|_w^2 = \bar{x}^T(w \otimes x)$$
$$\|x\|_2^2 = \bar{x}^T x$$

where ¯ represents complex conjugate, and T represents transposition respectively.

Also, b',c' are defined as follows:

$$b' = F^{-1}[\overline{F[b]}]$$

$$c' = F^{-1}[\overline{F[c]}]$$

where F represents Fourier transform, and $F^{-1}$ represents inverse Fourier transform.

The above object of the present invention is also effectively achieved by the construction that said evaluation function is formulated with respect to said high-resolution image of spatial region as follows:

$$I(h) = \|F^{-1}[\tilde{b} \otimes F[h]] - f\|_w^2 + \alpha \|F^{-1}[\tilde{c} \otimes F[h]]\|_2^2$$

said differential of said evaluation function with respect to said high-resolution image of spatial region is formulated as follows:

$$\frac{\partial I}{\partial h} = 2F^{-1}[\tilde{b}' \otimes F[w \otimes (F^{-1}[\tilde{b} \otimes F[h]] - f)]] + 2\alpha F^{-1}[\tilde{c}' \otimes \tilde{c} \otimes F[h]]$$

where h is vector representation of said high-resolution image of spatial region, b is vector representation of a PSF image, $\tilde{b}$ is Fourier transform of b, c is vector representation of a kernel image indicating prior information about said high-resolution image, $\tilde{c}$ is Fourier transform of c, $\tilde{b}'$ is Fourier transform of b', $\tilde{c}'$ is Fourier transform of c', f is vector representation of a mean observed image, w is vector representation of a weighted image, α represents a constraint parameter indicating constraint intensity, * represents a convolution integral operation, ⊗represents multiplication for every element, F represents Fourier transform, and $F^{-1}$ represents inverse Fourier transform respectively.

The above object of the present invention is also effectively achieved by the construction that said evaluation function is formulated with respect to said high-resolution image of frequency region as follows:

$$I(\tilde{h}) = \|F^{-1}[\tilde{b} \otimes \tilde{h}] - f\|_w^2 + \frac{\alpha}{\rho}\|\tilde{c} \otimes \tilde{h}\|_2^2$$

said differential of said evaluation function with respect to said high-resolution image of frequency region is formulated as follows:

$$\frac{\partial I}{\partial \tilde{h}} = 2\tilde{b}' \otimes F[w \otimes (F^{-1}[\tilde{b} \otimes \tilde{h}] - f)] + 2\frac{\alpha}{\rho}\tilde{c}' \otimes \tilde{c} \otimes \tilde{h}$$

where $\tilde{h}$ is vector representation of said high-resolution image of frequency region, b is vector representation of a PSF image, $\tilde{b}$ is Fourier transform of b, $\tilde{b}'$ is Fourier transform of b', f is vector representation of a mean observed image, w is vector representation of a weighted image, c is vector representation of a kernel image indicating prior information about said high-resolution image, $\tilde{c}$ is Fourier transform of c, $\tilde{c}'$ is Fourier transform of c', α represents a constraint parameter indicating constraint intensity, ρ represents a constant that standardizes a difference in constant multiple based on Fourier transform, * represents convolution integral operation, ⊗represents multiplication for every element, F represents Fourier transform, and $F^{-1}$ represents inverse Fourier transform.

BRIEF DESCRIPTION OF THE DRAWINGS

The file of this patent contains at least one drawing executed in color. Copies of this patent with color drawing(s) will be provided by the Office upon request and payment of the necessary fee.

FIG. 7(A) shows the result of super-resolution processing which utilized the "evaluation function based on mean pixel value" expressed by Expression 3, FIG. 7(B) shows the result of super-resolution processing performed by utilizing the fast method of super-resolution processing in accordance with Embodiment 1 of the present invention, FIG. 7(C) shows the result of super-resolution processing performed by utilizing the fast method of super-resolution processing in accordance with Embodiment 2 of the present invention, FIG. 7(D) shows the result of super-resolution processing performed by utilizing the fast method of super-resolution processing in accordance with Embodiment 3 of the present invention.

THE BEST MODE FOR CARRYING OUT THE INVENTION

The following is a description of preferred embodiments for carrying out the present invention, with reference to the accompanying drawings.

The present invention utilizes the evaluation function disclosed in Japanese Patent Application No. 2004-316154, and realizes speeding up of the super-resolution processing by calculating the evaluation function and the differential of the evaluation function with respect to a high-resolution image with a combination of basic image operations, or by further applying Fourier transform.

By the way, in the super-resolution processing, each pixel of multiple observed images (multiple low-resolution images) having displacements is allocated to a certain position of a high-resolution image space by carrying out registration. That is to say, it can be considered that the multiple observed images after the registration are pixels sampled at unequal interval within the high-resolution image space.

Here, let us consider approximating the position of pixel sampled at unequal interval (hereinafter also referred to simply as "the observed pixel position") by the pixel position of the high-resolution image (hereinafter also referred to simply as "the high-resolution pixel position"). In this case, it can be considered that there are multiple observed pixels (i.e. multiple the observed pixel positions) approximated by a certain high-resolution pixel position. On the other hand, there are the high-resolution pixel positions by which no observed pixel (i.e. the observed pixel position) is approximated.

Here, one image which is called "a mean observed image", can be generated by calculating the mean pixel value of multiple the observed pixels approximated by each high-resolution pixel position. The mean observed image is equal to the high-resolution image in the pixel interval (the number of pixels), and corresponds to an image obtained by blurring the high-resolution image with point spread function (PSF) obtained from a camera model. However, in the mean observed image, the pixel value of the pixel position by which no observed pixel is approximated, is not defined. The number of the observed pixels approximated by each high-resolution pixel position also constructs one image and we call such an image "a weighted image".

Furthermore, we consider that the PSF also constructs one image. Then, in the case of calculating the evaluation function and the differential of the evaluation function with respect to the high-resolution image, it is necessary to take into account the following four images: a high-resolution image h[i,j]; a PSF image b[i,j]; a mean observed image f[i,j]; and a weighted image w[i,j]. In the present invention, the evaluation function and the differential of the evaluation function with respect to the high-resolution image are calculated by a combination of image operations among the four kinds of images.

More specifically, the present invention has a precondition, that is, in the evaluation function disclosed in Japanese Patent Application No. 2004-316154, the size of small area is set equal to pixel of the high-resolution image, and the representative position of small area is set as the center of the corresponding pixel.

In this case, as shown in the following Expression 3, the evaluation function of the whole super-resolution processing consists of an error term (the first term on the right-hand side of Expression 3) and a constraint term (the second term on the right-hand side of Expression 3). The evaluation function expressed by Expression 3 is also called an "evaluation function based on mean pixel value".

$$I = \sum_{i=1}^{N} w_i \{b_i^T h - \bar{f}_i\}^2 + \alpha \|c * h\|_2^2 \qquad \text{[Expression 3]}$$

Where h is vector representation of the high-resolution image, N represents the number of small areas, $b_i$ is vector representation of the PSF corresponding to the representative position of the i-th small area, $w_i$ represents the number of the pixels within the i-th small area, $\bar{f}_i$ represents the mean pixel value of the pixels within the i-th small area, c represents kernel indicating the prior information about the high-resolution image, α represents the constraint parameter indicating the constraint intensity, and * represents convolution operation respectively.

As described above, since the size of small area is set as the size of the pixel of the high-resolution image, the number of small areas (N) is equal to the number of the pixels of the high-resolution image, and the representative position of the small area is equal to the pixel center of the high-resolution image. Also, the constraint parameter α may be 0 (α=0), and in such a case, the evaluation function of the whole super-resolution processing consists of only the error term (the first term on the right-hand side of Expression 3).

The fast method of super-resolution processing in accordance with the present invention is applied to a reconstruction-based super-resolution processing based on an evaluation function which consists of an error term and a constraint term as shown in Expression 3.

In the present invention, an evaluation function obtained by redefining the "evaluation function based on mean pixel value" shown in Expression 3 with the above mentioned four kinds of images, which are the high-resolution image, the PSF image, the mean observed image, and the weighted image, is used as the evaluation function of the whole super-resolution processing, and evaluation functions and the differential of the evaluation functions are calculated by calculation method of the redefined evaluation function and its differential (this will be described in detail in the Embodiments). In this manner, the present invention realizes speeding up of the super-resolution processing. Also, in the present invention, the all evaluation functions which are redefined with the abovementioned four kinds of images, consist of an error term and a constraint term.

Embodiment 1

In a fast method of super-resolution processing in accordance with Embodiment 1 (hereinafter also referred to simply as Method 1), the above described four kinds of images are utilized, and the "evaluation function based on mean pixel value" shown in Expression 3 is redefined with respect to spatial representation of a high-resolution image (hereinafter also referred to simply as "the high-resolution image h of spatial region" or "the high-resolution image h"). Furthermore, the calculations of the redefined evaluation function and the differential of the evaluation function with respect to the high-resolution image are also carried out in spatial region.

First, in the fast method of super-resolution processing in accordance with Embodiment 1, the evaluation function of the whole super-resolution processing is formulated by the following Expression 4, and the differential of the evaluation function with respect to the high-resolution image is formulated by the following Expression 5 by using the above described four kinds of images.

Here, the first term of the right-hand side of Expression 4 is referred to as "the error term of Method 1", and the second term of the right-hand side of Expression 4 is referred to as "the constraint term of Method 1". The first term of the right-hand side of Expression 5 is referred to as "the differential of the error term with respect to the high-resolution image which is utilized in Method 1", and the second term of the right-hand side of Expression 5 is referred to as "the differential of the constraint term with respect to the high-resolution image which is utilized in Method 1".

$$I(h) = \|b*h-f\|_w^2 + \alpha \|c*h\|_2^2 \quad \text{[Expression 4]}$$

$$\frac{\partial I}{\partial h} = 2b' * (w \otimes (b*h-f)) + 2\alpha c' * c * h \quad \text{[Expression 5]}$$

Where h is vector representation of the high-resolution image, b is vector representation of the PSF image, f is vector representation of the mean observed image, w is vector representation of the weighted image, c is vector representation of the kernel image indicating prior information about the high-resolution image, and α represents the constraint parameter indicating constraint intensity respectively. Also, * represents convolution integral operation, and ⊗ represents multiplication for every element.

Further, two norms $\|X\|_w^2, \|x\|_2^2$ are defined by the following Expression 6 and Expression 7.

$$\|x\|_w^2 = \bar{x}^T (w \otimes x) \quad \text{[Expression 6]}$$

$$\|x\|_2^2 = \bar{x}^T x \quad \text{[Expression 7]}$$

Where, ¯ represents complex conjugate, and T represents transposition respectively.

Further, b',c' are defined by the following Expression 8 and Expression 9.

$$b' = F^{-1}[\overline{F[b]}] \quad \text{[Expression 8]}$$

$$c' = F^{-1}[\overline{F[c]}] \quad \text{[Expression 9]}$$

Where, F represents Fourier transform, and $F^{-1}$ represents inverse Fourier transform respectively.

Figure 1:
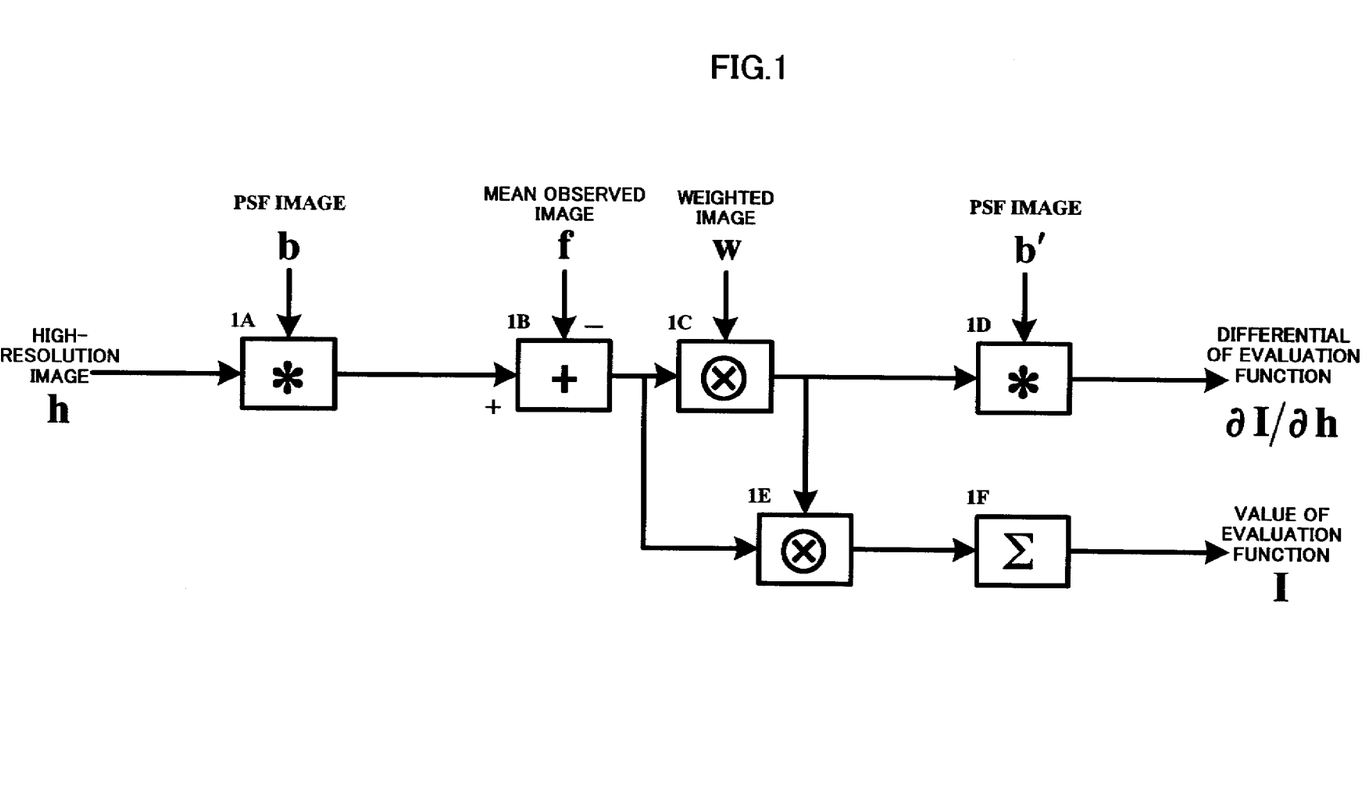
FIG. 1 is a block diagram showing the procedures for calculating an error term of an evaluation function and the differential of the error term with respect to a high-resolution image that are used in the fast method of super-resolution processing in accordance with Embodiment 1 of the present invention (Method 1)
Figure 2:
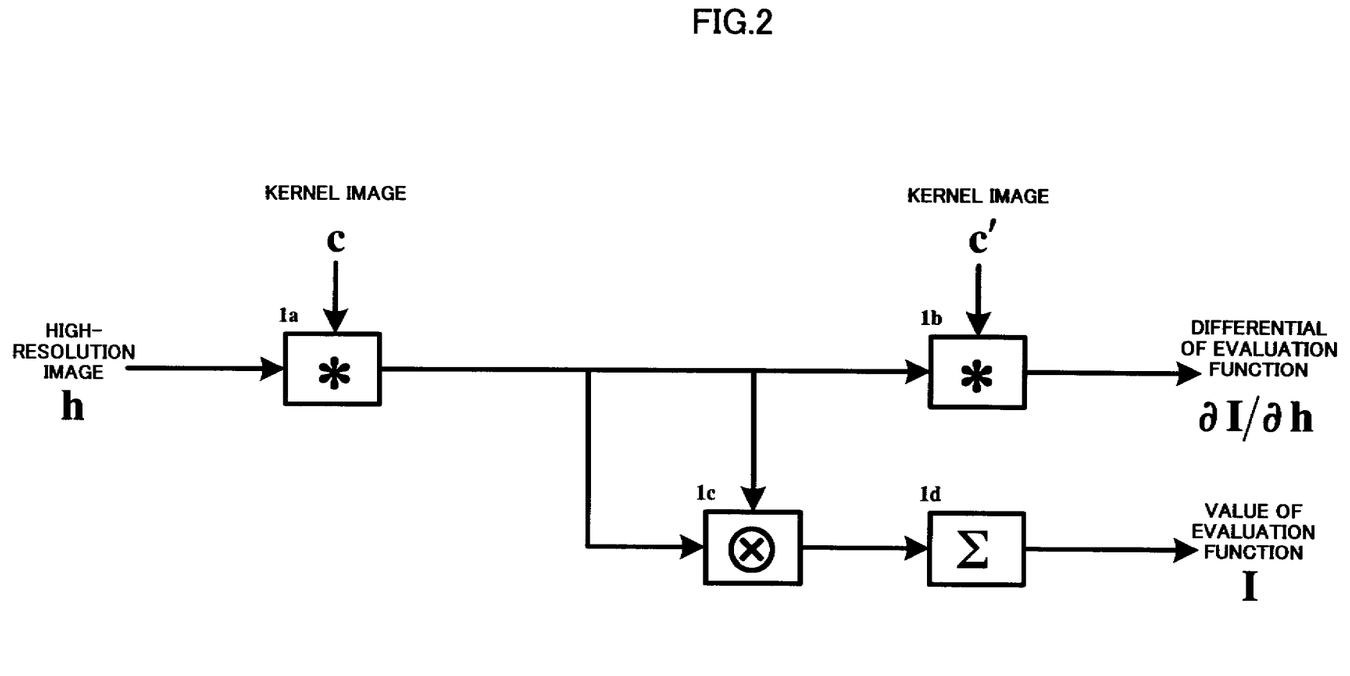
FIG. 2 is a block diagram showing the procedures for calculating a constraint term of the evaluation function and the differential of the constraint term with respect to the high-resolution image that are used in the fast method of super-resolution processing in accordance with Embodiment 1 of the present invention (Method 1)

FIG. 1 is a block diagram showing the procedures for calculating an error term and the differential of the error term with respect to a high-resolution image that are used in Method 1. FIG. 2 is a block diagram showing the procedures for calculating a constraint term and the differential of the constraint term with respect to the high-resolution image that are used in Method 1.

In FIG. 1 and FIG. 2, * represents convolution integral operation, + represents addition for every element, ⊗ represents multiplication for every element, and Σ represents an operation for calculating the sum of the elements.

As shown in FIG. 1, the procedures for calculating an error term and the differential of the error term with respect to a high-resolution image that are used in Method 1 are as follows.

Step 1A:
The convolution integral operation with the high-resolution image h and the PSF image b is carried out.

Step 1B:
The mean observed image f is subtracted from the result of the convolution integral operation of Step 1A.

Step 1C:
The result of the operation performed in Step 1B is multiplied by the weighted image w.

Step 1D:
The differential of the error term of the evaluation function that is used in the Method 1 is obtained by performing the convolution integral operation with the multiplication result of Step 1C and the PSF image b'.

Step 1E:
The result of the operation performed in Step 1B is multiplied by the result of the multiplication performed in Step 1C.

Step 1F:
The value of the error term of the evaluation function that is used in Method 1 is obtained by an operation for calculating the sum of the elements based on the result of the multiplication performed in Step 1E.

As shown in FIG. 2, the procedures for calculating a constraint term and the differential of the constraint term with respect to a high-resolution image that are used in Method 1 are as follows.

Step 1a:

The convolution integral operation with the high-resolution image h and the kernel image c indicating prior information about the high-resolution image is carried out.

Step 1b:

The differential of the constraint term of the evaluation function that is used in the Method 1 is obtained by performing the convolution integral operation with the result of the convolution integral operation of Step 1a and the kernel image c'.

Step 1c:

The result of the convolution integral operation of Step 1a is multiplied by the result of the convolution integral operation of Step 1a.

Step 1d:

The value of the constraint term of the evaluation function that is used in Method 1 is obtained by an operation for calculating the sum of the elements based on the result of the multiplication performed in Step 1c.

Embodiment 2

In a fast method of super-resolution processing in accordance with Embodiment 2 (hereinafter also referred to simply as Method 2), the above described four kinds of images are utilized, and the "evaluation function based on mean pixel value" shown in Expression 3 is redefined with respect to spatial representation of a high-resolution image. Method 2 differs from Method 1 in that convolution integral operation of Method 2 is performed through Fourier transform.

In the fast method of super-resolution processing in accordance with Embodiment 2, the evaluation function of the whole super-resolution processing is formulated by the following Expression 10, and the differential of the evaluation function with respect to the high-resolution image is formulated by the following Expression 11 by using the above described four kinds of images.

Here, the first term of the right-hand side of Expression 10 is referred to as "the error term of Method 2", and the second term of the right-hand side of Expression 10 is referred to as "the constraint term of Method 2". The first term of the right-hand side of Expression 11 is referred to as "the differential of the error term with respect to the high-resolution image which is utilized in Method 2", and the second term of the right-hand side of Expression 11 is referred to as "the differential of the constraint term with respect to the high-resolution image which is utilized in Method 2".

$$I(h) = \|F^{-1}[\tilde{b} \otimes F[h]] - f\|_w^2 + \alpha \|F^{-1}[\tilde{c} \otimes F[h]]\|_2^2 \quad \text{[Expression 10]}$$

$$\frac{\partial I}{\partial h} = 2F^{-1}[\tilde{b}' \otimes F[w \otimes (F^{-1}[\tilde{b} \otimes F[h]] - f)]] + \quad \text{[Expression 11]}$$
$$2\alpha F^{-1}[\tilde{c}' \otimes \tilde{c} \otimes F[h]]$$

Where, $\tilde{b}$ represents Fourier transform of b, $\tilde{c}$ represents Fourier transform of c, $\tilde{b}'$ represents Fourier transform of b', and $\tilde{c}'$ represents Fourier transform of c' respectively. Further, in Expression 10 and Expression 11, the other symbols are the same as those used in Method 1, and therefore, explanation of them is omitted here.

Figure 3:
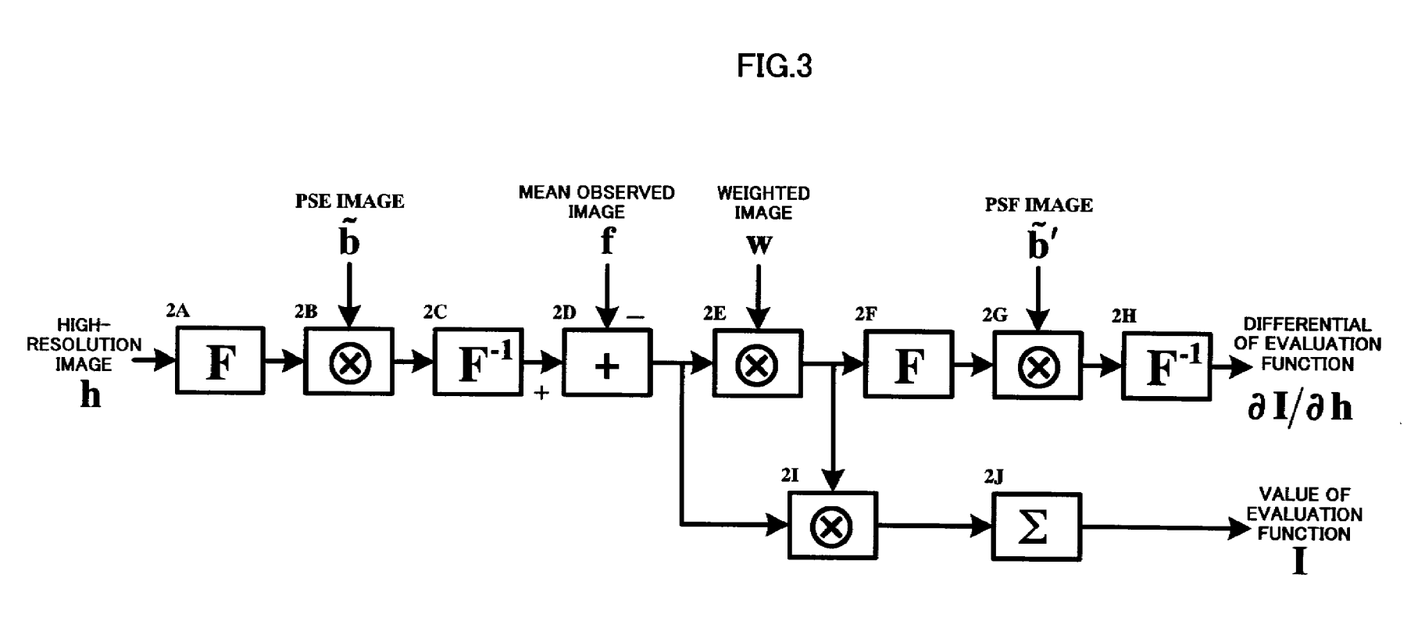
FIG. 3 is a block diagram showing the procedures for calculating an error term of an evaluation function and the differential of the error term with respect to a high-resolution image that are used in the fast method of super-resolution processing in accordance with Embodiment 2 of the present invention (Method 2)
Figure 4:
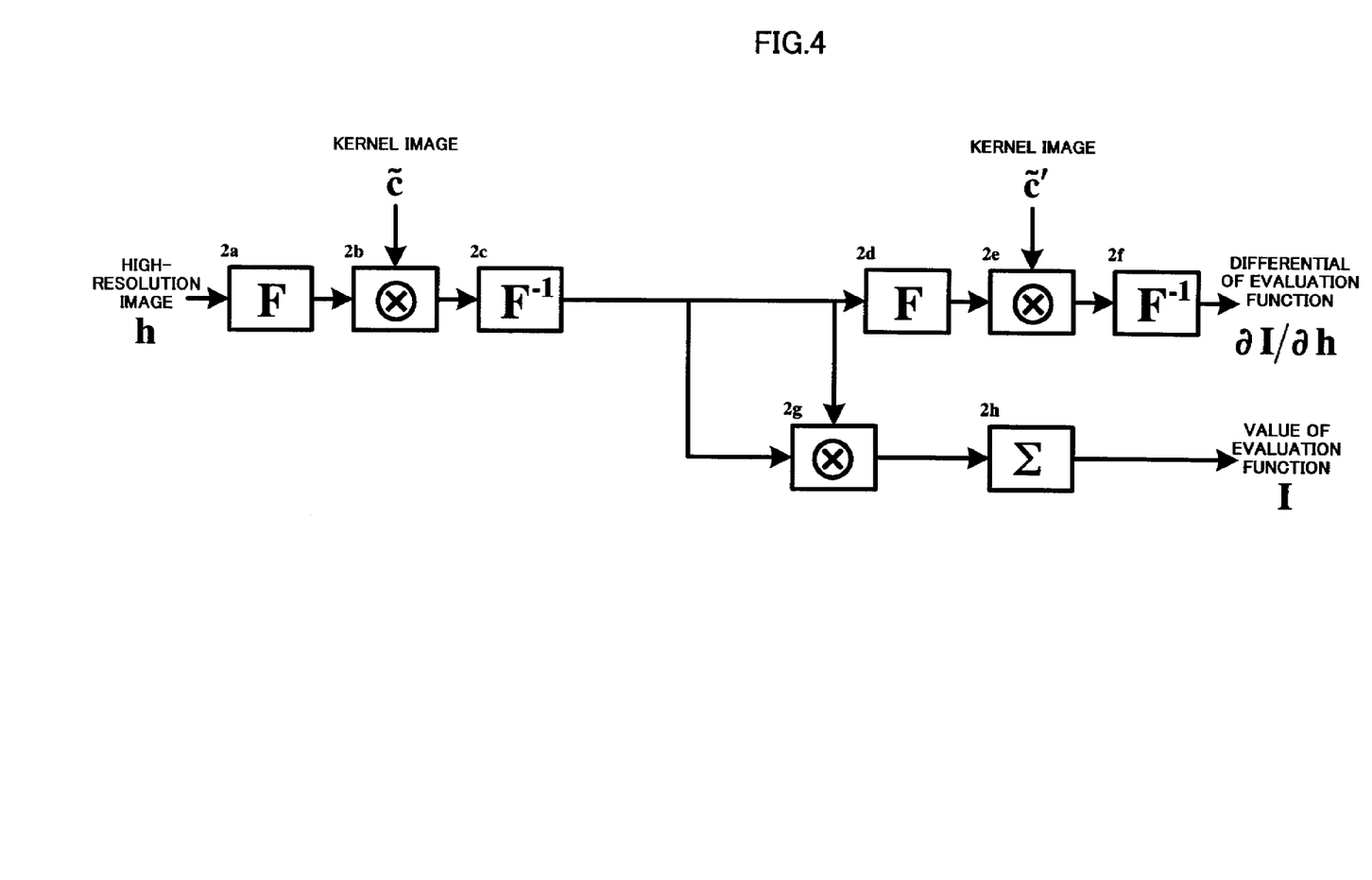
FIG. 4 is a block diagram showing the procedures for calculating a constraint term of the evaluation function and the differential of the constraint term with respect to the high-resolution image that are used in the fast method of super-resolution processing in accordance with Embodiment 2 of the present invention (Method 2)

FIG. 3 is a block diagram showing the procedures for calculating an error term and the differential of the error term with respect to a high-resolution image that are used in Method 2. FIG. 4 is a block diagram showing the procedures for calculating a constraint term and the differential of the constraint term with respect to the high-resolution image that are used in Method 2.

In FIG. 3 and FIG. 4, F represents Fourier transform, $F^{-1}$ represents inverse Fourier transform, + represents addition for every element, ⊗ represents multiplication for every element, and Σ represents an operation for calculating the sum of the elements.

As shown in FIG. 3, the procedures for calculating an error term and the differential of the error term with respect to a high-resolution image that are used in Method 2 are as follows.

Step 2A:

Fourier transform of the high-resolution image h is performed.

Step 2B:

The result of Fourier transform performed in Step 2A is multiplied by the PSF image $\tilde{b}$.

Step 2C:

Inverse Fourier transform of the result of multiplication performed in Step 2B is performed.

Step 2D:

The mean observed image f is subtracted from the result of inverse Fourier transform performed in Step 2C.

Step 2E:

The result of the operation performed in Step 2D is multiplied by the weighted image w.

Step 2F:

Fourier transform of the result of multiplication performed in Step 2E is performed.

Step 2G:

The result of Fourier transform performed in Step 2F is multiplied by the PSF image $\tilde{b}'$.

Step 2H:

The differential of the error term of the evaluation function that is used in the Method 2 is obtained by performing inverse Fourier transform of the result of multiplication performed in Step 2G.

Step 2I:

The result of the operation performed in Step 2D is multiplied by the result of multiplication performed in Step 2E.

Step 2J:

The value of the error term of the evaluation function that is used in Method 2 is obtained by an operation for calculating the sum of the elements based on the result of multiplication performed in Step 2I.

As shown in FIG. 4, the procedures for calculating a constraint term and the differential of the constraint term with respect to a high-resolution image that are used in Method 2 are as follows.

Step 2a:

Fourier transform of the high-resolution image h is performed.

Step 2b:

The result of Fourier transform performed in Step 2a is multiplied by the kernel image $\tilde{c}$.

Step 2c:

Inverse Fourier transform of the result of multiplication performed in Step 2b is performed.

Step 2d:

Fourier transform of the result of inverse Fourier transform performed in Step 2c is performed.

Step 2e:

The result of Fourier transform performed in Step 2d is multiplied by the kernel image $\tilde{c}'$.

Step 2f:

The differential of the constraint term of the evaluation function that is used in the Method 2 is obtained by performing inverse Fourier transform of the result of multiplication performed in Step 2e.

Step 2g:

The result of inverse Fourier transform performed in Step 2c is multiplied by the result of inverse Fourier transform performed in Step 2c.

Step 2h:

The value of the constraint term of the evaluation function that is used in Method 2 is obtained by an operation for calculating the sum of the elements based on the result of multiplication performed in Step 2g.

Embodiment 3

Embodiment 1 and Embodiment 2 disclose the methods in which the "evaluation function based on mean pixel value" shown in Expression 3 is redefined with respect to the high-resolution image h of spatial region, and the optimization for the high-resolution image of spatial region is performed.

As is well known, there is a one-to-one relation between the high-resolution image of spatial region (h) and the high-resolution image of frequency region ($\tilde{h}$) corresponding to Fourier transform of the high-resolution image h (hereinafter also referred to simply as "the high-resolution image $\tilde{h}$ of frequency region"). Accordingly, optimizing the high-resolution image of frequency region and optimizing the high-resolution image of spatial region can be said to be equivalent processing.

Therefore, instead of the high-resolution image h of spatial region, it is also possible to reconstruct a high-resolution image by performing an optimizing calculation with respect to the high-resolution image $\tilde{h}$ of frequency region. In the case of performing optimization with respect to the high-resolution image $\tilde{h}$ of frequency region, the evaluation function $I(\tilde{h})$ is expressed by the following Expression 12.

That is to say, in a fast method of super-resolution processing in accordance with Embodiment 3 (hereinafter also referred to simply as Method 3), the "evaluation function based on mean pixel value" shown in Expression 3 is redefined with respect to frequency representation of the high-resolution image i.e. the high-resolution image $\tilde{h}$ of frequency region. Method 3 differs from Method 1 and Method 2 in that the evaluation function of Method 3 is redefined with respect to frequency representation of the high-resolution image.

In the fast method of super-resolution processing in accordance with Embodiment 3, the evaluation function of the whole super-resolution processing is formulated by the following Expression 12, and the differential $$\frac{\partial I}{\partial \tilde{h}}$$

of the evaluation function with respect to the high-resolution image $\tilde{h}$ of frequency region is formulated by the following Expression 13.

Here, the first term of the right-hand side of Expression 12 is referred to as "the error term of Method 3", and the second term of the right-hand side of Expression 12 is referred to as "the constraint term of Method 3". The first term of the right-hand side of Expression 13 is referred to as "the differential of the error term with respect to the high-resolution image $\tilde{h}$ of frequency region which is utilized in Method 3", and the second term of the right-hand side of Expression 13 is referred to as "the differential of the constraint term with respect to the high-resolution image $\tilde{h}$ of frequency region which is utilized in Method 3".

$$I(\tilde{h}) = \|F^{-1}[\tilde{b} \otimes \tilde{h}] - f\|_w^2 + \frac{\alpha}{\rho}\|\tilde{c} \otimes \tilde{h}\|_2^2 \quad \text{[Expression 12]}$$

$$\frac{\partial I}{\partial \tilde{h}} = 2\tilde{b}' \otimes F[w \otimes (F^{-1}[\tilde{b} \otimes \tilde{h}] - f)] + 2\frac{\alpha}{\rho}\tilde{c}' \otimes \tilde{c} \otimes \tilde{h} \quad \text{[Expression 13]}$$

Where, $\tilde{h}$ is vector representation of the high-resolution image of frequency region, and ρ is a constant that standardizes the difference in constant multiple based on Fourier transform. Further, in Expression 12 and Expression 13, the other symbols are the same as those used in Method 1 and Method 2, and therefore, explanation of them is omitted here.

Figure 5:
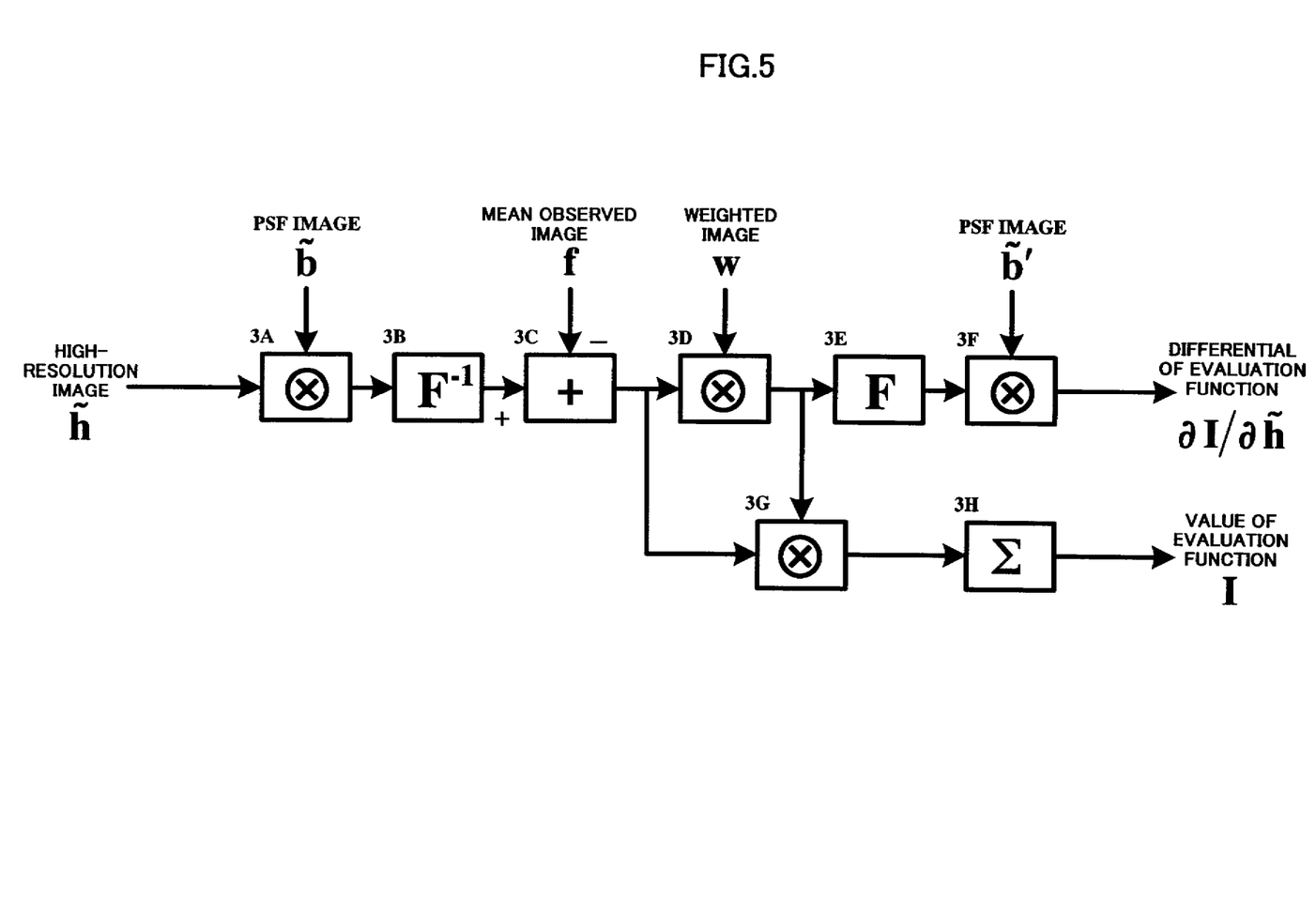
FIG. 5 is a block diagram showing the procedures for calculating an error term of an evaluation function and the differential of the error term with respect to a high-resolution image in a frequency region that are used in the fast method of super-resolution processing in accordance with Embodiment 3 of the present invention (Method 3)
Figure 6:
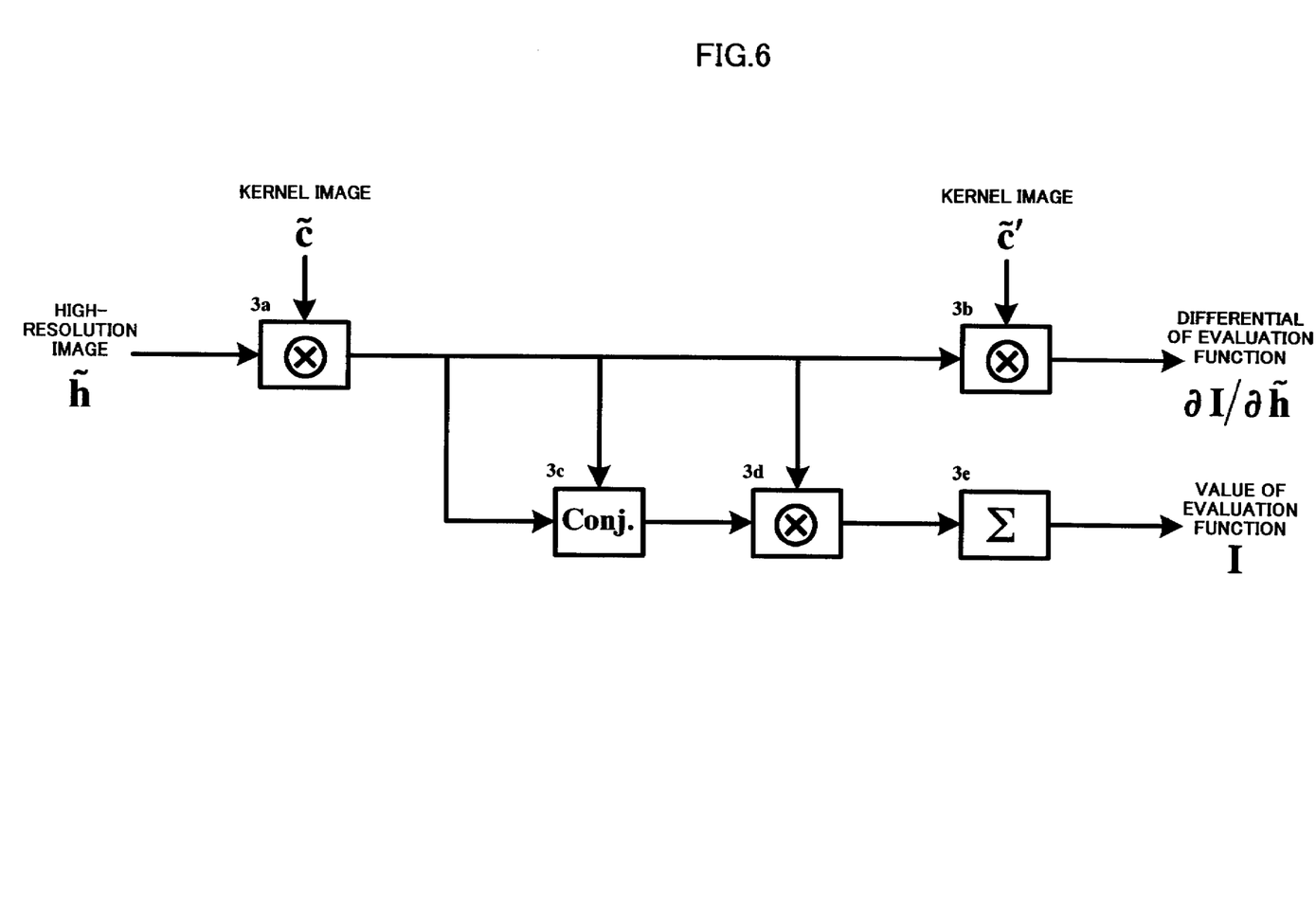
FIG. 6 is a block diagram showing the procedures for calculating a constraint term of the evaluation function and the differential of the constraint term with respect to the high-resolution image in a frequency region that are used in the fast method of super-resolution processing in accordance with Embodiment 3 of the present invention (Method 3)

FIG. 5 is a block diagram showing the procedures for calculating an error term and the differential of the error term with respect to a high-resolution image of frequency region that are used in Method 3. FIG. 6 is a block diagram showing the procedures for calculating a constraint term and the differential of the constraint term with respect to the high-resolution image of frequency region that are used in Method 3.

In FIG. 5 and FIG. 6, F represents Fourier transform, $F^{-1}$ represents inverse Fourier transform, + represents addition for every element, ⊗ represents multiplication for every element, Σ represents an operation for calculating the sum of the elements, and Conj. represents an operation for obtaining complex conjugate for every element.

As shown in FIG. 5, the procedures for calculating an error term and the differential of the error term with respect to a high-resolution image $\tilde{h}$ of frequency region that are used in Method 3 are as follows.

Step 3A:

The high-resolution image $\tilde{h}$ of frequency region is multiplied by the PSF image $\tilde{b}$.

Step 3B:

Inverse Fourier transform of the result of multiplication performed in Step 3A is performed.

Step 3C:

The mean observed image f is subtracted from the result of inverse Fourier transform performed in Step 3B.

Step 3D:

The result of multiplication performed in Step 3C is multiplied by the weighted image w.

Step 3E:

Fourier transform of the result of multiplication performed in Step 3D is performed.

Step 3F:

The differential of the error term of the evaluation function of Method 3 with respect to the high-resolution image $\tilde{h}$ of frequency region is obtained by performing multiplication with the result of Fourier transform performed in Step 3E and the PSF image $\tilde{b}'$.

Step 3G:

The result of the operation performed in Step 3C is multiplied by the result of multiplication performed in Step 3D.

Step 3H:

The value of the error term of the evaluation function that is used in Method 3 is obtained by an operation for calculating the sum of the elements based on the result of multiplication performed in Step 3G.

As shown in FIG. 6, the procedures for calculating a constraint term and the differential of the constraint term with respect to a high-resolution image $\tilde{h}$ of frequency region that are used in Method 3 are as follows.

Step 3a:

The high-resolution image $\tilde{h}$ of frequency region is multiplied by the kernel image $\tilde{c}$.

Step 3b:

The differential of the constraint term of the evaluation function of Method 3 with respect to the high-resolution image $\tilde{h}$ of frequency region is obtained by performing multiplication with the result of multiplication performed in Step 3a and the kernel image $\tilde{c}'$.

Step 3c:

With respect to the result of multiplication performed in Step 3a, an operation for obtaining complex conjugate for every element is performed.

Step 3d:

The result of the operation performed in Step 3c is multiplied by the result of multiplication performed in Step 3a.

Step 3e:

The value of the constraint term of the evaluation function that is used in Method 3 is obtained by an operation for calculating the sum of the elements based on the result of multiplication performed in Step 3d.

So far, the specific embodiments of the present invention have been described. Next, the fast method of super-resolution processing in accordance with the present invention is applied to actual images taken by a handheld camera, and effectiveness of the present invention is verified. In the super-resolution processing, sixteen observed images with Bayer arrangement were used as low-resolution image. The 60×60 area of low-resolution image was subjected to the super-resolution processing with a magnification ratio of 4×4, to reconstruct a 240×240 high-resolution image. A Gaussian PSF was used for the PSF. A Laplacian constraint kernel was used as the constraint kernel. The optimizing calculation was performed by steepest descent method, and the number of times for iterative calculation was 20. As for the registration, since a handheld camera was used for taking low-resolution image, the "gradient method which presupposes projective transformation" disclosed in Non-Patent Document 5 was utilized. For the calculations, a CPU of 2.8 [GHz] (Pentium 4) (a registered trademark) was utilized.

Figure 7:
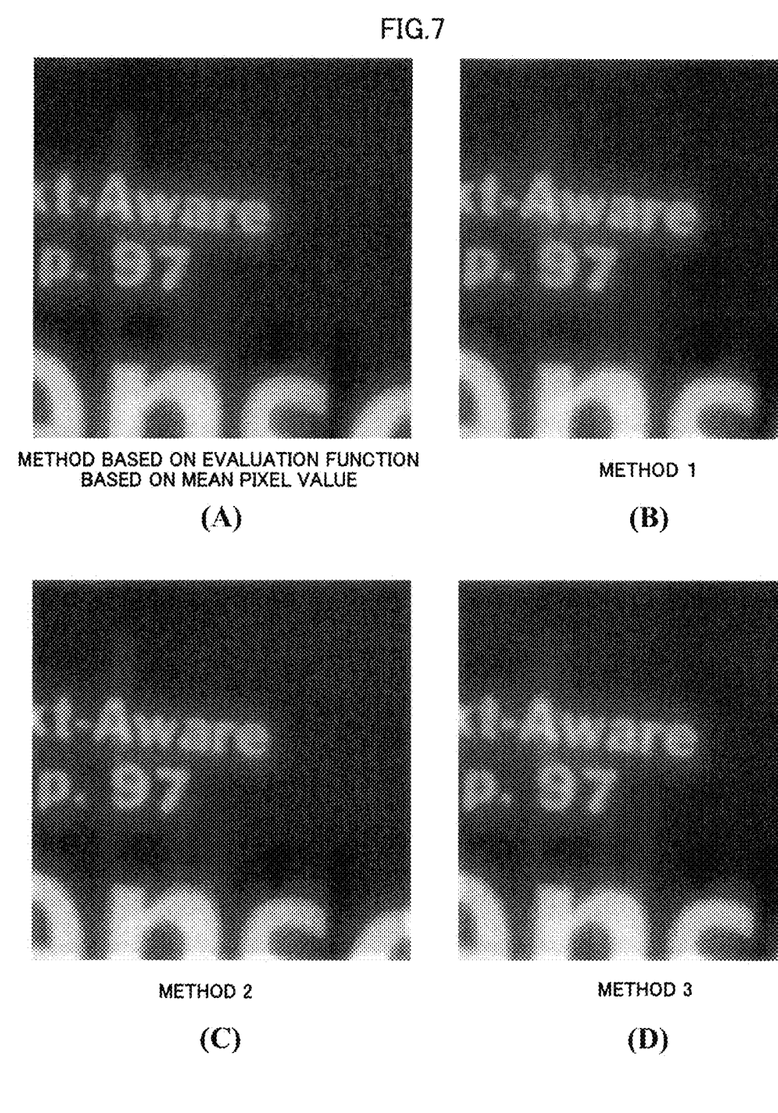
FIG. 7 shows the results of super-resolution processing performed by the fast method of super-resolution processing in accordance with the present invention.

FIG. 7 shows the result of super-resolution processing by the "Fast Method of Super-Resolution Processing" suggested by the inventors of the present invention and disclosed in Japanese Patent Application No. 2004-316154, and the results of super-resolution processing by the fast method of super-resolution processing in accordance with the present invention.

More specifically, FIG. 7(A) shows the result of super-resolution processing based on the "evaluation function based on mean pixel value" expressed by Expression 3. FIG. 7(B) shows the result of super-resolution processing performed by utilizing the fast method of super-resolution processing in accordance with Embodiment 1 of the present invention. FIG. 7(C) shows the result of super-resolution processing performed by utilizing the fast method of super-resolution processing in accordance with Embodiment 2 of the present invention. FIG. 7(D) shows the result of super-resolution processing performed by utilizing the fast method of super-resolution processing in accordance with Embodiment 3 of the present invention.

The four different results of super-resolution processing shown in FIG. 7(A), FIG. 7(B), FIG. 7(C) and FIG. 7(D) are substantially the same as subjective assessments. Next, the calculation time of each super-resolution processing is checked. To obtain the super-resolution processing result shown in FIG. 7(A), a calculation time of 9.62 [sec] is required. To obtain the super-resolution processing result shown in FIG. 7(B), a calculation time of 1.38 [sec] is required. To obtain the super-resolution processing result shown in FIG. 7(C), a calculation time of 1.01 [sec] is required. To obtain the super-resolution processing result shown in FIG. 7(D), a calculation time of 0.59 [sec] is required.

By the way, as disclosed in Japanese Patent Application No. 2004-316154, it is apparent that the super-resolution processing that applied the fast method of super-resolution processing according to Japanese Patent Application No. 2004-316154, i.e. the super-resolution processing based on the "evaluation function based mean pixel value" expressed by Expression 3, becomes higher speed than the conventional super-resolution processing. It is apparent that the super-resolution processing by the fast method of super-resolution processing in accordance with the present invention realized further speedup than the super-resolution processing by the method disclosed in Japanese Patent Application No. 2004-316154 by comparing the above mentioned super-resolution processing calculation times.

That is to say, it was confirmed that, compared with the super-resolution processing based on the "evaluation function based on mean pixel value", the calculation time by Method 1 of the present invention was 6.97 times shorter, the calculation time by Method 2 was 9.52 times shorter, and the calculation time by Method 3 was 16.3 times shorter.

INDUSTRIAL APPLICABILITY

As described above, in the fast method of super-resolution processing in accordance with the present invention, an evaluation function and the differential of the evaluation function with respect to a high-resolution image are calculated through a combination of basic image operations, so as to achieve the excellent effects of greatly reducing the calculation costs required for super-resolution processing and realizing speeding up of super-resolution processing accordingly.

Also, by applying the fast method of super-resolution processing in accordance with the present invention to actual images, realization of speeding up of super-resolution processing was verified.

THE LIST OF REFERENCES

Non-Patent Document 1:
Sung C. P. and Min K. P., "Super-Resolution Image Reconstruction: A Technical Overview", IEEE Signal Proc. Magazine, Vol. 26, No. 3, p. 21-36, 2003

Non-Patent Document 2:
B. C. Tom and A. K. Katsaggelos, "Reconstruction of a high-resolution image by simultaneous registration, restoration, and interpolation of low-resolution images", Proc. IEEE Int. Conf. Image Processing, Vol. 2, p. 539-542, 1995

Non-Patent Document 3:
R. R. Schulz and R. L. Stevenson, "Extraction of high-resolution frames from video sequences", IEEE Trans. Image Processing, Vol. 5, p. 996-1011, 1996

Non-Patent Document 4:
H. Stark and P. Oskoui, "High resolution image recovery from image-plane arrays, using convex projections", J. Opt. Soc. Am. A, Vol. 6, p. 1715-1726, 1989

Non-Patent Document 5:
S. Baker and I. Matthews, "Lucas-Kanade 20 Years On: A Unifying Framework", International Journal of Computer Vision, Vol. 56, No. 3, p. 221-255, 2004

What is claimed is:

1. A fast method of super-resolution processing for speeding up a super-resolution processing that estimates a high-resolution image from multiple low-resolution images with displacements, the method comprising:
   registering pixels of the multiple low-resolution images to pixels in the high-resolution image;
   determining a mean observed image by calculating a mean pixel value of a plurality of pixels from among the pixels of the multiple low-resolution images registered to the pixels in the high-resolution image;
   determining a weighted image using pixels of the multiple low-resolution images that are registered to the pixels in the high-resolution image;
   determining a PSF using a point spread function;
   estimating said high-resolution image by using an evaluation function obtained by adding a constraint term based on prior information about said high-resolution image to a weighted sum of squares of a difference between a result of a convolution integral of said high-resolution image and said PSF image and said mean observed image and a differential of said evaluation function with respect to said high-resolution image; and
   calculating said weighted sum of squares based on said weighted image,
   wherein said fast method of super-resolution processing is performed by a processor.

2. A fast method of super-resolution processing according to claim 1, wherein said evaluation function is formulated with respect to said high-resolution image as follows:

$$I(h) = \|b*h - f\|_w^2 + \alpha \|c*h\|_2^2$$

said differential of said evaluation function with respect to said high-resolution image is formulated as follows:

$$\frac{\partial I}{\partial h} = 2b' * (w \otimes (b*h - f)) + 2\alpha c' * c * h$$

where h is vector representation of said high-resolution image of spatial region, b is vector representation of the PSF image, f is vector representation of the mean observed image, w is vector representation of the weighted image, c is vector representation of a kernel image indicating prior information about said high-resolution image, α represents a constraint parameter indicating constraint intensity, * represents convolution integral operation, and ⊗ represents multiplication for every element;

two norms $\|x\|_w^2, \|x\|_2^2$ are defined as follows:

$$\|x\|_w^2 = \bar{x}^T (w \otimes x)$$

$$\|x\|_2^2 = \bar{x}^T x$$

where ‾ represents complex conjugate, and T represents transposition respectively; and
b',c' are defined as follows:

$$b' = F^{-1}[\overline{F[b]}]$$

$$c' = F^{-1}[\overline{F[c]}]$$

where F represents Fourier transform, and $F^{-1}$ represents inverse Fourier transform.

3. A fast method of super-resolution processing according to claim 1, wherein said evaluation function is formulated with respect to said high-resolution image as follows:

$$I(h) = \|F^{-1}[\tilde{b} \otimes F[h]] - f\|_w^2 + \alpha \|F^{-1}[\tilde{c} \otimes F[h]]\|_2^2$$

said differential of said evaluation function with respect to said high-resolution image is formulated as follows:

$$\frac{\partial I}{\partial h} = 2F^{-1}[\tilde{b}' \otimes F[w \otimes (F^{-1}[\tilde{b} \otimes F[h]] - f)]] + 2\alpha F^{-1}[\tilde{c}' \otimes \tilde{c} \otimes F[h]]$$

where h is vector representation of said high-resolution image, b is vector representation of the PSF image, $\tilde{b}$ is Fourier transform of b, c is vector representation of a kernel image indicating prior information about said high-resolution image, $\tilde{c}$ is Fourier transform of c, $\tilde{b}'$ is Fourier transform of b', $\tilde{c}'$ is Fourier transform of c', f is vector representation of the mean observed image, w is vector representation of the weighted image, α represents a constraint parameter indicating constraint intensity, * represents a convolution integral operation, ⊗ represents multiplication for every element, F represents Fourier transform, and $F^{-1}$ represents inverse Fourier transform respectively;

two norms $\|x\|_w^2, \|x\|_2^2$ are defined as follows:

$$\|x\|_w^2 = \bar{x}^T (w \otimes x)$$

$$\|x\|_2^2 = \bar{x}^T x$$

where ‾ represents complex conjugate, and T represents transposition respectively; and
b',c' are defined as follows:

$$b' = F^{-1}[\overline{F[b]}]$$

$$c' = F^{-1}[\overline{F[c]}]$$

where F represents Fourier transform, and $F^{-1}$ represents inverse Fourier transform.

4. A fast method of super-resolution processing according to claim 1, wherein said evaluation function is formulated with respect to said high-resolution image as follows:

$$I(\tilde{h}) = \|F^{-1}[\tilde{b} \otimes \tilde{h}] - f\|_w^2 + \frac{\alpha}{\rho} \|\tilde{c} \otimes \tilde{h}\|_2^2$$

said differential of said evaluation function with respect to fourier transform of said high-resolution image is formulated as follows:

$$\frac{\partial I}{\partial \tilde{h}} = 2\tilde{b}' \otimes F[w \otimes (F^{-1}[\tilde{b} \otimes \tilde{h}] - f)] + 2\frac{\alpha}{\rho} \tilde{c}' \otimes \tilde{c} \otimes \tilde{h}$$

where $\tilde{h}$ is vector representation of fourier transform of said high-resolution image, b is vector representation of the PSF image, $\tilde{b}$ is Fourier transform of b, $\tilde{b}'$ is Fourier transform of b', f is vector representation of the mean observed image, w is vector representation of the weighted image, c is vector representation of a kernel image indicating prior information about said high-resolution image, $\tilde{c}$ is Fourier transform of c, $\tilde{c}'$ is Fourier transform of c', α represents a constraint parameter indicating constraint intensity, ρ represents a constant that standardizes a difference in constant multiple based on Fourier transform, * represents convolution integral operation, ⊗ represents multiplication for every element, F represents Fourier transform, and $F^{-1}$ represents inverse Fourier transform;

two norms $\|x\|_w^2, \|x\|_2^2$ are defined as follows:

$$\|x\|_w^2 = \bar{x}^T(w \otimes x)$$

$$\|x\|_2^2 = \bar{x}^T x$$

where ¯ represents complex conjugate, and T represents transposition respectively; and b',c' are defined as follows:

$$b' = F^{-1}[\overline{F[b]}]$$

$$c' = F^{-1}[\overline{F[c]}]$$

where F represents Fourier transform, and $F^{-1}$ represents inverse Fourier transform.

* * * * *